March 4, 1930.  W. W. BIRD  1,749,272
AIRPLANE
Filed Sept. 21, 1927  2 Sheets-Sheet 1
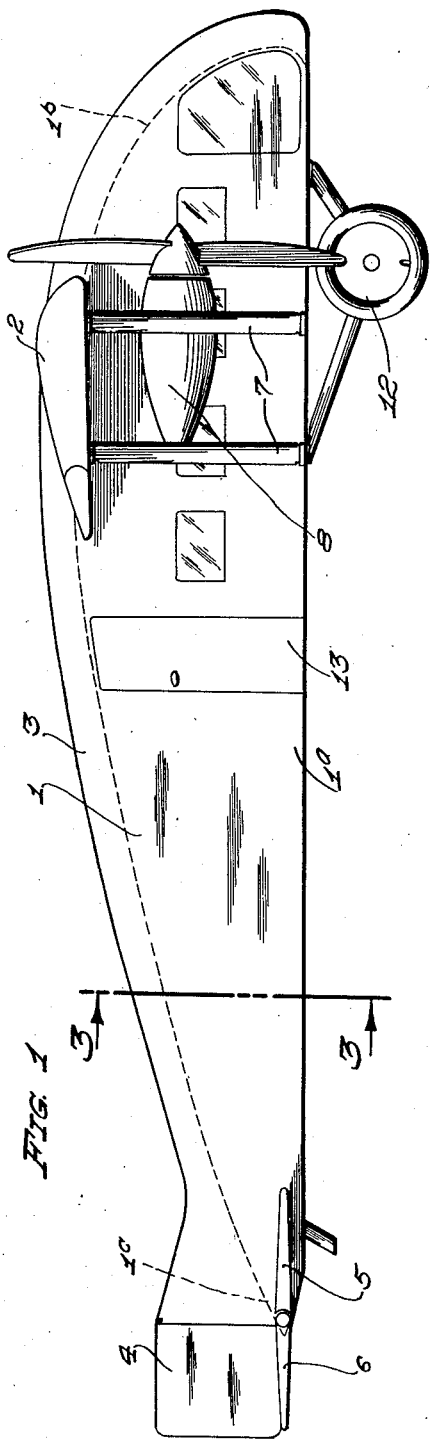
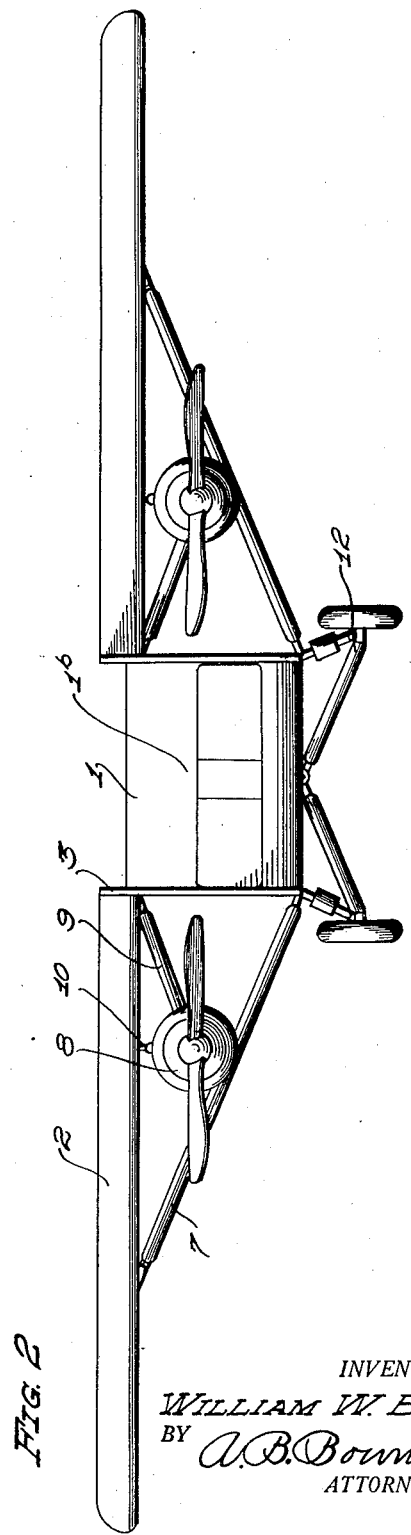
INVENTOR.
WILLIAM W. BIRD
BY A. B. Bowman
ATTORNEY

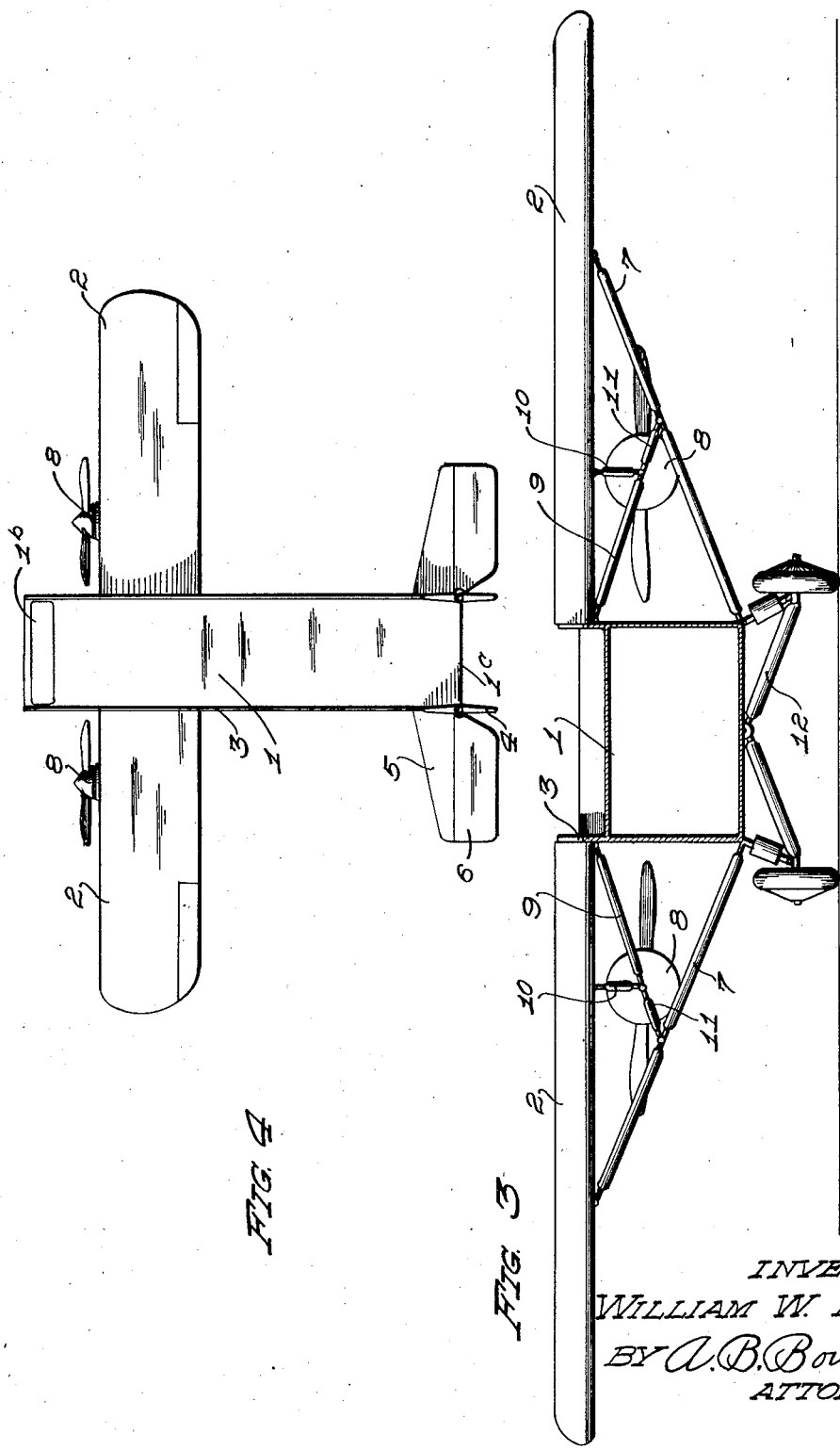

Patented Mar. 4, 1930

1,749,272

UNITED STATES PATENT OFFICE

WILLIAM W. BIRD, OF SAN DIEGO, CALIFORNIA

AIRPLANE

Application filed September 21, 1927. Serial No. 220,971.

My invention relates to airplanes, and the objects of my invention are: first, to provide a novel fuselage construction for airplanes whereby the head resistance will be reduced to a minimum; second, to provide a fuselage for airplanes which is so shaped as to add considerably to the lifting power of the airplane; third, to provide an airplane fuselage having a longitudinal vertical cross section corresponding in shape to the transverse cross-section of a wing section; fourth, to provide an airplane fuselage of this class having upwardly extending webs at the upper edges of its lateral sides whereby the lift of the airplane will be increased by the vacuum created at the upper side of the fuselage; fifth, to provide an airplane having a fuselage of the class described whereby large and readily accessible carrying space can be provided in the fuselage, and a fuselage having considerable head room; sixth, to provide an airplane fuselage in which the spacious pilot's compartment may be provided in the nose thereof and whereby a large field of vision is provided for the pilot; seventh, to provide a novel mounting of the wings of the airplane on the fuselage; eighth, to provide an airplane of this class in which there is a staggered decalage, that is, the side wings are at a slight angle to the fuselage, thereby providing a different angle of attack on the air which tends to stabilize the center of pressure; and ninth, to provide, as a whole, a novelly constructed airplane and one which is particularly simple and economical of construction, durable and efficient.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Figure 1 is a side elevational view of my airplane; Fig. 2 is a front elevational view thereof on a reduced scale; Fig. 3 is a sectional elevational view thereof taken through 3—3 of Fig. 1, and Fig. 4 is a top view thereof on a still smaller reduced scale.

Like characters of reference refer to similar parts and portions throughout the views of the drawings.

The airplane, illustrated in the drawings, is of the monoplane type, having a fuselage 1 in the center and wings 2 extending to either side thereof. The longitudinal vertical cross section of the fuselage is similar to that of the conventional wing section. The fuselage is preferably of uniform width from nose to tail, as shown best in Fig. 4. The side walls of the fuselage are extended upwardly above the normal upper surface of the fuselage, forming upwardly extending webs 3. These webs 3 provide vertical stabilizers from nose to tail, and also provide means for preserving the vacuum at the upper side of the fuselage as the same passes through the air, thus considerably aiding in the lift of the airplane. The rear ends of the webs 3 terminate at substantially the tail end of the fuselage and are substantially widened at the tail end. On the rear ends or edges of the webs are pivotally mounted rudders 4, one on each web. Thus, the directional control is in line with the long vertical stabilizing web means. The horizontal stabilizers, designated 5, are extended laterally to either side of the fuselage. On the rear edges of the horizontal stabilizers, are pivotally mounted the elevators 6.

The wings 2 are preferably separate members and are secured at their inner ends to the outer sides of the webs 3, and also to the upper portion of the fuselage, as shown in Fig. 2. The wings 2 are braced relative to the fuselage by struts 7 extending from intermediate the ends of the undersides of the wings to the lower portions of the fuselage.

It will be here noted that the wings 2 are positioned at a slightly different angle relatively to the fuselage 1, thereby providing a staggered decalage, the wings 2 and fuselage 1 being in staggered angular relation to each other, thereby providing a different angle of attack on the air which tends to stabilize the center of pressure.

The airplane illustrated is also of the twinmotored type, the motors being supported in streamlined housings 8 which are positioned at either side of the fuselage between the wings and the struts and are supported by struts 9, 10 and 11, extending from the wings and the struts 7, as shown in Figs. 2 and 3. It will be noted, however, that my airplane may be of the single-motor type with the motor mounted in the nose of the fuselage, or with any number of motors desired.

The airplane may be provided with any suitable under-carriage 12 mounted on, below and intermediate the ends of the fuselage, as shown.

In the side of the fuselage may be provided a door 13 which may extend from the bottom to the top and thus provide considerable space for entrance to the cabin.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an airplane, a fuselage having a substantially flat bottom side, a blunt nose curved upwardly and backwardly, and an upper side tapered gradually from the forward end to a fin edge at the tail end, said fuselage having vertical vanes at the lateral edges of its upper surface, said vanes extending from said nose to the tail.

2. In an airplane, a fuselage having a substantially flat bottom side, a blunt nose curved upwardly and backwardly, and an upper side tapered gradually from the forward end to a fin edge at the tail end, said fuselage having vertical vanes from said nose to the tail, and wings secured at their inner ends to the outer sides of said vanes and braced relative to the fuselage.

3. In an airplane, a fuselage having a substantially flat bottom side, a blunt nose curved upwardly and backwardly, and an upper side tapered gradually from the forward end to a fin edge at the tail end, the upper side of the fuselage having an upwardly extending vertical web at its lateral edges extending from the forward edge of said nose toward the tail of the fuselage, and directional rudders pivotally mounted at the rear ends of said webs.

4. In an airplane, a fuselage having a substantially flat bottom side, a blunt nose curved upwardly and backwardly, and an upper side tapered gradually from the forward end to a fin edge at the tail end, the upper side of the fuselage having an upwardly extending vertical web at its lateral edges extending from the forward edge of said nose toward the tail of the fuselage, directional rudders pivotally mounted at the rear ends of said webs, horizontal stabilizers extending to the lateral sides of the fuselage beyond said webs, and elevators pivotally mounted at the rear edges of said horizontal stabilizers.

In testimony whereof, I have hereunto set my hand at San Diego, California, this 14th day of September, 1927.

WILLIAM W. BIRD.